UNITED STATES PATENT OFFICE.

RALPH BAGGALEY, OF PITTSBURG, PENNSYLVANIA.

METHOD OF PRODUCING VITRIFIED BRICK, TILE, AND VARIOUS SHAPES.

No. 810,022.     Specification of Letters Patent.     Patented Jan. 16, 1906.

Application filed December 23, 1903. Serial No. 186,335.

*To all whom it may concern:*

Be it known that I, RALPH BAGGALEY, of Pittsburg, Allegheny county, Pennsylvania, have invented a new and useful Method of Producing Vitrified Brick, Tile, and Various Shapes, of which the following is a full, clear, and exact description.

The object of my invention is to utilize a hitherto waste by-product and without manual labor to produce vitrified bricks, tiles, paving-blocks, and many other useful shapes. The material which I employ is the silicate-of-iron slag from a copper-smelter furnace, and to produce slag suitable for my purpose the charge of ores and fluxes in the furnace should be such that the resulting slag will be a silicate of iron containing not less than ten per cent. of lime and preferably more. After this slag has flowed from the forehearth of the smelting-furnace in which it is separated from its contained mineral-bearing mattes I conduct it by gravity to a suitable brick or tile molding machine, which I will now describe. This machine consists of a series of suitable heavy molds that move by power in front of the slag-spout, in which manner each mold in succession is charged or filled with a suitable quantity of slag. The top of the mold is then scraped or brushed by a scraper or brush forming part of the machine, so as to remove every particle of congealed slag or other obstruction. As each mold moves forward and after it has received its charge of slag and after the top surface of the mold has been properly scraped and brushed and any surplus of slag has thus been removed from the mold a cover greater in weight than the brick or tile itself is dropped automatically upon the mold. The upper side of the mold and the under side of the cover should be planed surfaces or should form a perfect joint; otherwise a fin or fins will result on the brick or tile in the subsequent operations of the machine. The outer portion of the slag in contact with the mold-surface chills very quickly, while the inner portion remains molten for a considerable time. I avail myself of this fact by applying pressure to the inner portion of the congealing article to cause it to fill the cavities of the mold. For this purpose after the cover has been placed upon the mold by the machine a central movable section of the cover is dropped automatically and enters the still molten slag in the central portion of the mold. This produces indentations or corrugations on the middle surface of the brick or tile and also by its weight creates a pressure upon that portion of the article that is still molten, forcing it upward against the superincumbent cover and making a perfect brick or tile with sharp edges. The bottom of the mold is also indented or corrugated, and similar spaces are therefore provided on each side of each brick or tile for the mortar, hydraulic cement, or other binding agent that may be used in construction-work to hold the brick or tile in place. Red brick or firebrick as ordinarily used in construction-work are necessarily porous, and because of this fact mortar, hydraulic cement, or any other binding agent will form a perfect bond with them. This is not the case with vitrified brick or tile, which are impervious to water and to mortar or hydraulic cement, so that in order to create a bond in construction-work with such tiles or bricks their flat sides should be corrugated or indented, as above described. By flowing the slag into the molds, then removing the surplus slag, if any, from each mold and its edges, and then putting covers on the molds and applying pressure I produce articles which are not disfigured or injured by the breaking off of pouring-gates or sinking-heads, as in the case of slag articles heretofore made.

The machine is designed so that the travel of each mold will be sufficiently prolonged that the heavy mold and the heavy cover, as hereinbefore described, will have time to thoroughly solidify each brick or tile and to partially anneal the same before the discharge-point in the machine has been reached at which the brick or tile is discharged automatically. As each brick or tile is discharged from the machine it falls by gravity in a thoroughly-congealed state, though still very hot, into an elevator or conveyer bucket, whereupon dry sharp sand or dry granulated slag is automatically discharged by the machine in sufficient quantity to fill the bucket containing the hot article. In this manner the cooling of the article is retarded and it is prevented from becoming brittle.

The elevator carries the protected brick or tile to and over an annealing receptacle or soaking-pit, preferably constructed of brick, into which the still hot article with its accompanying sand or granulated slag is discharged. This operation is continued until the annealing-receptacle is completely charged, whereupon by a simple adjustment of the machine a suitable covering or envelop of dry sand or granulated slag is discharged by the elevator to a depth of one or two feet over the entire contents in order still further to protect the articles from the atmosphere and to force them to cool very slowly and to become thoroughly annealed. There may be a number of such annealing-pits into which the elevator may discharge, or, if preferred, the elevator may discharge onto another suitable conveyer whereby the hot articles still protected from the atmosphere may be delivered successively into any desired number of annealing-pits. It is important that roofs should be erected over the top of these annealing-pits in order to protect the contents from rain, snow, wind, or even from intense cold. The movement of the bricks or tiles through the elevator and into the annealing-pit will have the effect of removing any fins or excrescences that may exist upon them.

In constructing the annealing-pits I observe the following points: I provide the bottom with floors at an angle of about forty-five degrees, so that the brick and the sand or granulated slag can be discharged automatically by gravity when a suitable door at the side is opened for this purpose. I provide a railroad-track in front of the mouth of each pit, in such position and on such a level that the articles will be forced to slide by gravity into the center of each car and throughout the entire length of said car. At the bottom of the door I provide a grizzly or slide composed of bars or rods of iron or steel over which the bricks slide in their passage from the annealing-pit into the center of the railroad-car. The spaces between these bars are too small to permit the brick to fall through; but the sand or granulated slag will pass readily through them and will thus become thoroughly separated from the articles as both are discharged by gravity out of the annealing-pit. Underneath the bars I provide a suitable conveyer, which returns the sand or granulated slag to the supply-hopper of the machine, from which such material is again used in protecting and in annealing the brick or tile, as before stated.

Bricks and tiles produced by my invention possess important advantages. They are thoroughly annealed and of perfect shape and their density is such that rain will serve only to wash their surface wihout in any way injuring them. For sewers, foundations, and other underground structures they are of especial utility, because they are impervious to moisture and possess great power of resistance to crushing strains.

Many modifications of my invention will readily suggest themselves to those skilled in the art without departing from the spirit of my invention, since

What I claim is—

1. The method herein described of utilizing the silicate-of-iron slag from copper-smelting furnaces for the production of vitrified articles, which consists in flowing the molten slag into molds to completely fill the same, confining the slag at the rapidly-cooling marginal portions of the mold in closed molds, and applying pressure to the central hotter portions of the slag, and subsequently cooling and annealing; substantially as described.

2. The method herein described of utilizing the silicate-of-iron slag from copper-smelting furnaces for the production of vitrified articles, which consists in flowing the molten slag into molds to completely fill the same, confining the slag at the rapidly-cooling marginal portions thereof and applying pressure to the central hotter portions of the slag, and subsequently cooling and annealing the molded articles in a body of comminuted material such as dry sand or granulated slag; substantially as described.

In testimony whereof I have hereunto set my hand December 8, 1903.

RALPH BAGGALEY.

Witnesses:
THOMAS W. BAKEWELL,
H. M. CORWIN.